United States Patent [19]
Rosenthal et al.

[11] Patent Number: 5,953,400
[45] Date of Patent: Sep. 14, 1999

[54] COMMUNICATION SYSTEM FOR A CLOSED-USER GROUP

[75] Inventors: Eugene J. Rosenthal, Edison; David Phillip Silverman, Somerville, both of N.J.

[73] Assignee: AT&T Corp., New York, N.Y.

[21] Appl. No.: 08/683,325

[22] Filed: Jul. 18, 1996

[51] Int. Cl.[6] .................................................. H04M 3/42
[52] U.S. Cl. ..................... 379/202; 379/204; 455/416; 455/518
[58] Field of Search .................................... 379/201, 202, 379/207, 67.1, 88.2, 88.22, 204, 205, 216; 455/414, 415, 416, 517, 518, 519

[56] References Cited

U.S. PATENT DOCUMENTS

| | | | |
|---|---|---|---|
| 4,796,293 | 1/1989 | Blinken et al. | 379/202 |
| 5,099,510 | 3/1992 | Blinken, Jr. et al. | 379/202 |
| 5,235,631 | 8/1993 | Grube et al. | 455/519 |
| 5,369,694 | 11/1994 | Bales et al. | 379/202 |
| 5,408,518 | 4/1995 | Yunoki | 379/202 |
| 5,408,526 | 4/1995 | McFarland et al. | 379/202 |
| 5,465,391 | 11/1995 | Toyryla | 455/518 |
| 5,475,747 | 12/1995 | Bales et al. | 379/202 |
| 5,479,489 | 12/1995 | O'Brien | 379/67 |
| 5,483,588 | 1/1996 | Eaton et al. | 379/202 |
| 5,546,449 | 8/1996 | Hogan et al. | 379/202 |
| 5,559,875 | 9/1996 | Bieselin et al. | 379/202 |
| 5,559,876 | 9/1996 | Alperovich | 379/205 |
| 5,604,791 | 2/1997 | Lee | 379/67 |
| 5,619,555 | 4/1997 | Fenton et al. | 379/202 |
| 5,668,863 | 9/1997 | Bieselin et al. | 379/202 |
| 5,719,928 | 2/1998 | Pinnell et al. | 379/202 |
| 5,828,743 | 10/1998 | Pinnell et al. | 379/204 |
| 5,852,656 | 12/1998 | Sato et al. | 379/202 |

OTHER PUBLICATIONS

Lucent Technologies, Solutions for Definity Call Centers Issue 4.0.
AT&T Corp.: Conversant Voice Information System Description, 1995.
NYNEX: "Forget a Phone Number? Just say the word and NYNEX will connect you anyway." NYNEX Extra!, Jun. 1996.
Lucent Technologies: 5ESS–2000 Switch, downloaded from the Lucent Technologies Web Site, http://www.lucent.com/netsys/5ESS/centrex.html, Jan. 31, 1997, original publication date uknown.

*Primary Examiner*—Harry S. Hong
*Assistant Examiner*—Benny Q. Tieu

[57] ABSTRACT

A node configured for use in a telecommunications network. The node is programmable via an end-user-accessible interface to provide a mnemonic dialing service. The mnemonic dialing service allows members of a group to communicate with each other.

60 Claims, 6 Drawing Sheets

5,953,400

COMMUNICATION SYSTEM FOR A CLOSED-USER GROUP

FIELD OF THE INVENTION

The present invention relates generally to telecommunication systems and more particularly to a system and method for providing simplified, or mnemonic dialing within a group of subscribers of a telecommunication network.

BACKGROUND OF THE INVENTION

In conventional telephone networks, every telephone line is assigned a unique telephone number. In the United States, the unique number is generally ten digits long; even though only seven of these digits need to be dialed to place a local call. Some telephone lines have additional "alias" telephone numbers. For example, a telephone line may have both, its conventional ten-digit number and an "800" toll-free number. Some of these aliases may be quite short. For example, only three digits, namely, "911" need to be dialed from a telephone set to reach local emergency services.

Taking advantage of the abbreviated dialing system mentioned above, some communications carriers provide a service called Software Defined Network ("SDN"). SDN allows subscriber lines within a defined group of such lines to have short alias telephone numbers by which they can be connected to one another. Thus, one SDN subscriber within a group of subscribers can reach another subscriber within the same group by dialing fewer than the seven digits needed for conventional local calls, or fewer than ten digits needed for conventional long distance calls. This SDN feature is implemented by mapping in a routing table of the communications carrier the alias number of a subscriber with the conventional telephone number of that subscriber.

Some communications carriers also provide a service called "Centrex®" that allows fewer than seven or ten digits to be dialed for a call. The Centrex® service affords subscribers within a defined group various communications features including abbreviated dialing, conference calling, intercom calling to name a few. When a Centrex® user wishes to call someone outside of the group, a code must first be dialed to signal the switch that the call is a conventional call. Centrex® service may be provided by using the telephone switch of, for example, a Local Exchange Carrier ("LEC").

The prior art methods of defining groups of telephone users may have some disadvantages, especially when a group is to be established only on a temporary basis, and for a relatively short duration. There is a need for creating short duration temporary groups. For example, telephone subscribers who meet other subscribers at certain functions but who do not normally call each other on a regular basis, do not usually know each other's telephone numbers. It is also unlikely that such subscribers would be able to memorize each others' telephone numbers immediately. Examples of groups that may use such temporary services include:

(1) telephone subscribers from different companies attempting to meet a deadline for a common project;
(2) wireless communications subscribers representing a company for a day at a trade show;
(3) respective friends and relatives of a bride and groom trying to make final plans for a wedding; or
(4) acquaintances, friends and relatives of a deceased person attempting to make arrangements for his/her funeral.

These exemplary groups may not be able to benefit from prior art abbreviated dialing systems, especially when the duration of the group network would only last, for example, a few hours or a few days.

Conventional systems, such as those mentioned above, are generally utilized for far more permanent or long term groups of persons, such as the employees of an established business. The resources needed, overhead incurred, and set-up time required for such systems would not warrant their use on a temporary basis. Thus, there is a need for a method and apparatus that allows users of communications networks to establish temporary group networks. Such a system may also be applicable to wireless communications users. Finally, there is a need to provide for automatic conference calling among the members of a temporary group network.

SUMMARY OF THE INVENTION

The present invention is directed to a method and a system for using a node that is configurable via an end-user accessible interface to provide abbreviated dialing service to members of a closed-user group who wish to communicate with each other via a communications network. The node may also be configured to automatically establish conference calls among members of the closed-user group upon receiving a signal from a communications device of one of the members of the group. An enrollment unit may be used to establish membership in a closed-user group.

The invention may provide one or more of the following advantages. A temporary group network according to the present invention allows a group of users to have easily-dialed, easily-remembered "nickname" telephone numbers to reach each other. The users may select their own nickname numbers within their respective group. A user may select an utterance that, when spoken by any speaker in the group, will initiate a call to another member of the group. The configuration of a group (its membership, billing arrangement, and the nickname numbers for group members) may be selected and managed by members of the group, without the assistance of an operator, or a system administrator of the communications carrier providing the service. Finally, the system may provide for automatic conference calling among the group members.

DETAILED DESCRIPTION

A temporary group network ("TGN") according to the present invention allows a group (or groups) of users to have easily-dialed, easily-remembered "nickname" telephone numbers to reach each other through a telecommunications network. A specially-programmed node ("TGN node") is installed in a telephone network. The TGN node is programmable to allow subscribers to call one another using short "nickname" telephone numbers, thereby allowing individual subscribers to configure the membership of the group and the mnemonic nicknames by which subscribers may reach each other. This allows for mnemonic dialing, which is dialing using anything that assists, or is designed to assist, the user in remembering the number to be dialed. This can be accomplished using "nickname" telephone numbers or using spoken words to dial.

Figure 1:
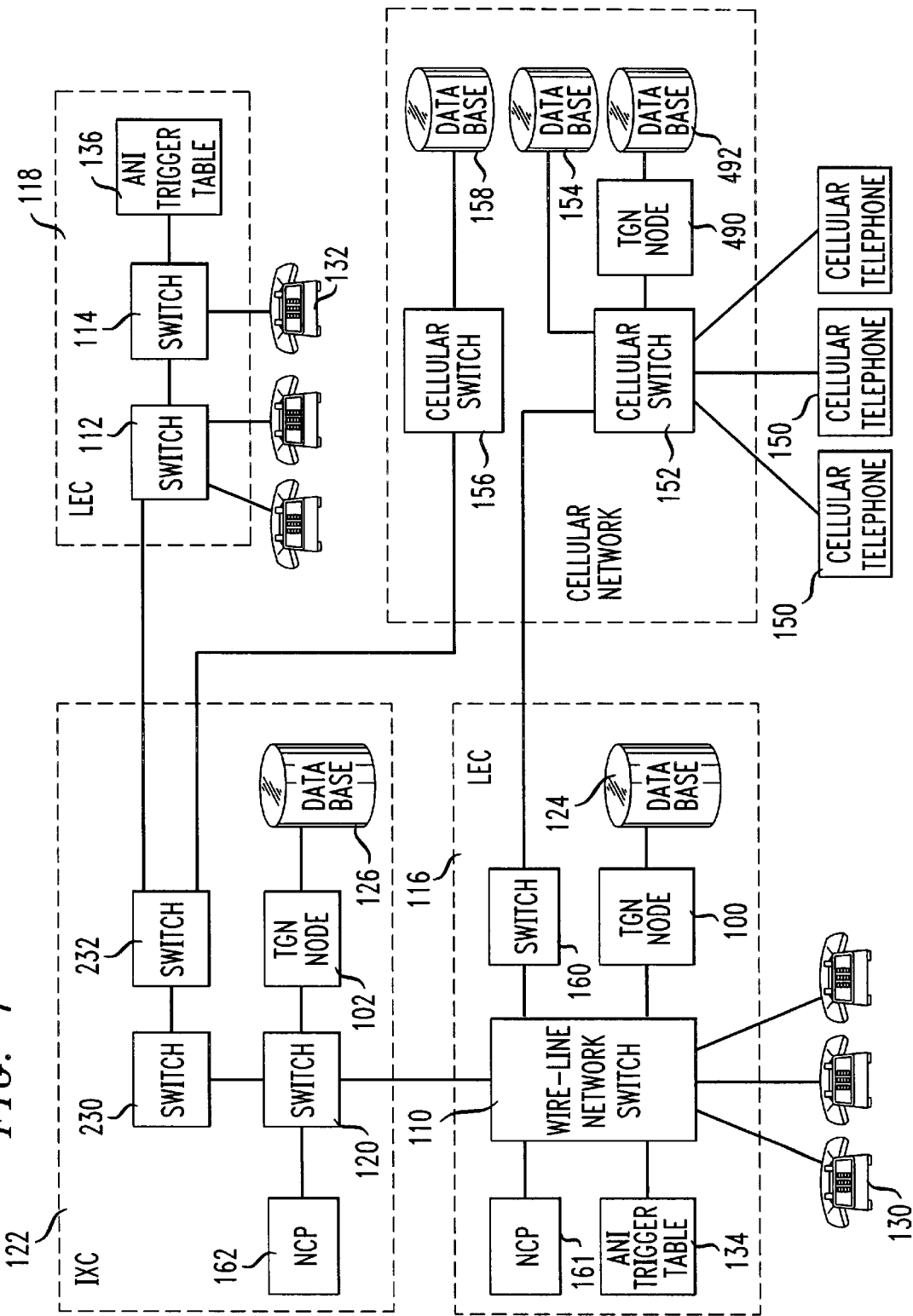
FIG. 1 is a block diagram of a communications network arranged in accordance with the invention.

Referring to FIG. 1, a TGN node, either 100 or 102, would typically be connected to one of the switches interior to a telephone network. The TGN node might be connected to one of the wire-line network switches 110, 112, 114 used by a LEC 116, 118 to provide local service, or it might be connected to a switch 120 of a long-distance carrier (an inter-exchange carrier, "IXC") 122. In either case, each TGN node 100, 102 references a database 124, 126 for storing information, for example, describing TGN groups, the members of the groups, the telephone numbers of the members, and billing information. The database may also store the duration of each TGN.

The telephone network of FIG. 1 is essentially a conventional network, with the addition of a TGN node (either 100 or 102) and some additional programming at some of the network nodes. Ordinary telephones 130, 132 are connected to the network in a conventional manner via equipment of a LEC 116, 118. Telephones 130, 132 are typically connected to an IXC network 122 through a series of switches 110, 112, 114. Though only one switch 110 is shown for LEC network 116, it may be typical to have several in the path between telephone 130 and IXC network 122. For example, telephone 132 has switches 112 and 114 in its path to the IXC network 122. Wire-line network switches 110, 122, 114 can be any of a number of conventional network switches, for example, the 5ESS® switch available from Lucent Technologies, Inc. Switches 120, 230, 232 in the IXC 122 may also be any of a number of conventional switches, for example, the 4ESS® switch available from Lucent Technologies, Inc.

Each telephone 130, 132, has a respective "home switch" 110, 114, which is the first switch in the network most closely connected to that telephone. The home switches 110, 114 have an ANI ("automatic number identification") trigger table 134, 136 attached. An "ANI" is a unique identifier for each telephone in a system and allows various functions such as caller identification to be performed. An ANI trigger table 134, 136 contains a list of ANI's for subscribers who participate in various special services offered by the LEC 116. It should be understood that other types of databases, including a database separate from or incorporated into the switch 110, 114 may be used in place of the ANI trigger table 134, 136.

Cellular telephones 150 may also be connected to the IXC network 122 through a cellular switch 152. To get to the IXC 122, the cellular switch 152 may have to first go through the LEC 116, including switches 110, 160 within the LEC. Alternatively, the cellular switch 156 may be connected to the IXC 122. The cellular switches used herein may be any of a number of conventional switches, such as the Autoplex® switch available from Lucent Technologies, Inc.

Network control points (NCP's) 161, 162 are used to direct telephone calls through the network by translating an 800 number into the canonical area code, exchange, and number.

In a preferred embodiment, TGN node 100, 102 may be implemented using a Conversant® which is commercially available from Lucent Technologies, Inc. A Conversant® is an audio response system or a voice response unit ("VRU"). A caller may be connected from a switch to the Conversant® so that the caller is able to interact with the Conversant® by using touch tone digits or voice commands. The Conversant® also includes switching capabilities that allow conferencing, re-directing calls in the system, and many other switching features. It may be able to route calls, join calls, record voice prompts, and give voice prompts that a user may respond to. Although TGN nodes 100, 102 appear in FIG. 1 as devices distinct from the network switches 110, 120, it should be understood that the invention is not so limited. TGN nodes 100, 102 may also be implemented as part of a telephone switch, for instance by adding the appropriate software and/or hardware to an existing switch. Alternatively, TGN node 100, 102 may be located remotely from the telephone switch or it may be located in a private branch exchange ("PBX").

The Conversant® voice response unit is further described in the book, *Conversant VIS System Description*, published by AT&T Corporation and now available from Lucent Technologies, Inc., which is incorporated herein by reference.

Databases 124, 126 of respective TGN node 100, 102 each contains information relating to the TGN with which it is associated. For example, the databases 124, 126 may contain the starting and ending times, and/or duration for various events associated with TGN groups. The duration of a TGN may be specified by a starting and ending time and/or a date. The duration may also be specified by an overall time period (two hours for example). The starting point for the time period may be the occurrence of a specified event or condition, including a system condition. In addition, the duration of the TGN could correspond to the duration of a given event, for example a trade show. As another example, during a natural disaster (an earthquake or fire) a TGN may be established between pre-defined emergency services. This would readily provide communication between these services during an emergency situation. In these situations, the TGN may be established by a signal from a system operator or a monitoring device.

Figure 2:
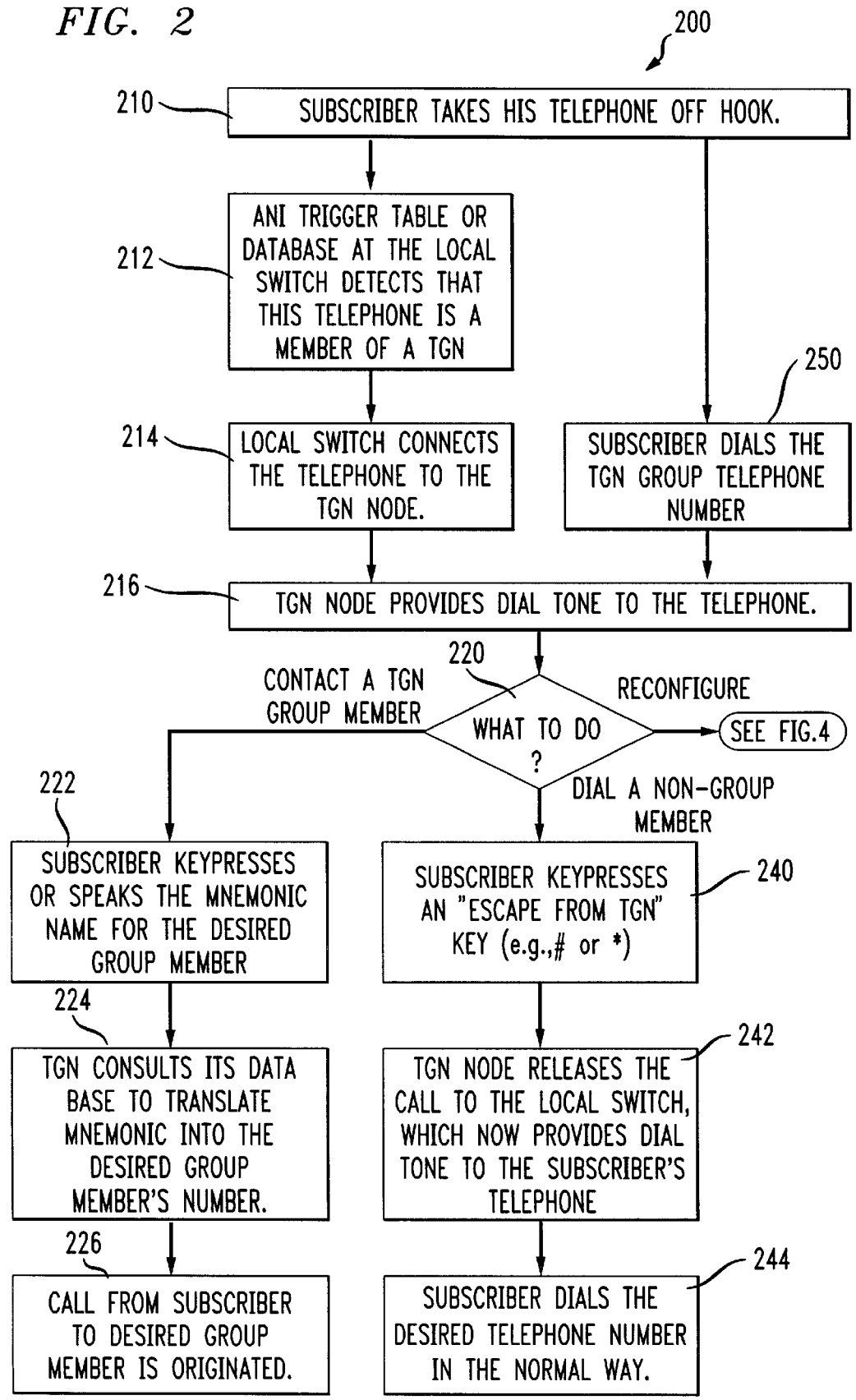
FIGS. 2, 3, and 4 are flowcharts, showing respectively use, set-up, and configuration of a system designed to implement the principles of the invention.

Referring to FIGS. 1 and 2, a subscriber at telephone 130 who is a member of a TGN may contact another member (for instance at telephone 132) of the TGN using the more-efficient method 200 provided by the invention. (For the present, assume that all set-up steps have already been performed, set-up of a TGN will be discussed below in connection with FIG. 3.) In step 210, as in a normal telephone call, the subscriber would take his telephone off hook. In the embodiment of steps 212 and 214, home switch 110 in step 212 inquires of ANI trigger table 134 whether telephone line 130 is to be given any special handling. When ANI trigger table 134 reports that telephone 130 is a member of a TGN group, switch 110 connects (step 214) telephone line 130 to the appropriate TGN node (100 or 102), as specified by the telephone's entry in ANI trigger table 134. The location of the TGN node (either at 100 or 102) is dependent upon where the node is set up for the desired user base and what company is offering the TGN service. If the IXC is offering the service, the TGN node 102 would be in the IXC 122. If the LEC is offering the service, the TGN node 100 would be in the LEC. Once the telephone 130 is connected to the TGN node 100, 102, the TGN node 100, 102 provides a signal that is ready to receive information, for example a dial tone, to telephone 130 (step 216).

In step 220, the subscriber at telephone 130 decides whether he or she wants to call a member of the group or a non-member. If the subscriber decides to call a group member, in step 222 the subscriber enters the mnemonic telephone number assigned to the desired member. The mnemonic telephone numbers may be assigned by the TGN node or almost at the will of the group members: for instance, the group may have two- or three-digit numbers corresponding to the initials of their names, or the members may be siblings in a family and assign themselves mnemonic numbers corresponding to their birth order. Alternatively, TGN node 100, 102 may be responsive to voice commands, and the subscriber at telephone 130 may select the desired group member by speaking the group member's name. Alternatively, TGN node 100, 102 may provide a list of the names and/or extension numbers and the telephone user may choose a selection from that list.

In step 224, TGN node 100, 102 takes the group member's name or mnemonic as entered by the subscriber at telephone 130, and uses the database 124, 126 to translate the member's name into a telephone number. In one embodiment, TGN node 100, 102 provides this telephone number to the subscriber's home switch 110, which in turn connects the subscriber at telephone 130 to the desired telephone 132 (step 226). In a second embodiment, TGN node 100, 102 instructs other switches 110, 120, 230, 232, 112, 114 of the system to connect the telephone 130 to the desired destination telephone 132.

In either case, the TGN node 100, 102 directs the subscriber's call to the appropriate member of the TGN. TGN node 100, 102 may provide a distinctive ring type at the dialed party's telephone based on whether the telephone call was from within or outside the TGN.

In the alternative case where a subscriber at telephone 130 wants to connect to a telephone that is not identified as a member of the TGN group, the subscriber at telephone 130 enters a code that indicates that he or she does not want to connect to a TGN group member (step 240). This is analogous to dialing "9" for an outside line in an office served by a PBX. TGN node 100, 102 releases the call and connects telephone 130 to the home switch 110 (step 242). Thereafter, the subscriber at telephone 130 dials a telephone number in the conventional way.

In another alternative embodiment, automatic steps 212 and 214 are replaced by manual step 250. Here, instead of ANI trigger table 134 and TGN node 100, 102 capturing the call, the caller, who may not be part of the TGN at all, manually dials into TGN node 100, 102 and connects to the appropriate TGN group. From this point, the subscriber enters the mnemonic nickname for the TGN group member he or she desires to call, as in steps 222–226 as previously discussed, or reconfigures the TGN (see FIG. 4), for example by joining the group.

In step 250 of FIG. 2, the subscriber at telephone 130 identifies a specific TGN group that he or she wishes to contact, join, configure, or reconfigure. This identification may be accomplished in any of several ways. Each TGN group may have a unique telephone number—thus a first TGN group might have the access telephone number of "1-800-TGN-GRP1" and a second TGN group may have access telephone number "1-800-TGN-GRP2." Alternatively, all TGN groups serviced by a given TGN node 100, 102 may have a single telephone number, and each TGN group may have a password to identify the specific TGN group serviced by TGN node 100, 102. In this case, if the subscriber at telephone 130 desires to enroll in a TGN to occur in the future, TGN node 100, 102 would first prompt the subscriber to enter a TGN group number or some other type of identification of the TGN group, which may include a starting and ending time. The subscriber may accomplish this through a number pad on a conventional telephone 130, 132 or through voice control. TGN node 100, 102 would then update the database 124, 126 as requested by the subscriber at telephone 130.

A TGN may be used by a group working toward a common deadline. For example, if two companies were attempting to meet a common deadline and employees from each company were working on the project, a TGN could be established for the project team members of both companies. With a TGN established, the team members, who may be in different locations, could easily contact each other via telephone by using, for example, one or two digit extension numbers. Also, various telephone services could also be offered to the TGN such as group conferencing, extension pick-up, call forwarding, etc.

A group of people preparing for a wedding may be another example of a use for a TGN. People involved in making the arrangements could conveniently communicate with each other, especially where the participants (from two different families) have not regularly contacted each other in the past and had not memorized all of the relevant telephone numbers. Mnemonic dialing or automatic conference calling could be utilized. Similarly, this service could be used by a funeral parlor. The funeral parlor could offer this service for family and friends of a deceased person.

TGN node 100, 102 is capable of providing other functions to the TGN group. The TGN group could have one large conference bridge or, when the telephone receiver is picked up, there could be a continuous conference call.

TGN node 100, 102 can be programmed so that when one user or member of the TGN group lifts her receiver, TGN node 100, 102 originates a conference call automatically by contacting all other members of the TGN group. The telephone sets of the other TGN group members would then ring. As each member answers his telephone, he or she could automatically be added to the conference call with the original caller and any other members who had also answered their phone in response to the ring. Optionally, before being connected to the conference call, the member being newly added may receive a voice announcement, an alert signal or other signal, e.g., a "go-ahead tone", from the TGN node informing him that he or she is about to be added to a conference call. In addition, as a new member is added to the conference call, the TGN node could so indicate to the existing participants in the conference call using, for example, a voice announcement, or other signal. By way of example, a distinctive ringing tone may be applied to each one of the telephone sets associated with the group in order to alert group members that the incoming call is a conference call. If one of the members of the TGN group fails to pick up his telephone when the conference is being established, the TGN node could either stop ringing the non-answering member after a predetermined number of rings, call the non-answering member back after a predetermined amount of time, or continuously ring the non-answering member for the duration of the conference call until he or she answers.

Alternatively, the TGN node could establish a continuous conference call so that whenever a member of the group lifted the receiver, he or she would be part of the continuous conference call. This could be used for a "chat" service for various groups. Signaling could be achieved using an alternative method such as paging thereby providing a wider geographic area of coverage.

Additionally, TGN node 100, 102 could utilize speech recognition to determine the TGN member to be contacted (e.g., one TGN member could access another TGN member simply by stating the name of the TGN member to be contacted). In this case, TGN node 100, 102 would access the database 124, 126. Because the TGN would probably have a relatively small number of members, a voice recognition system, such as a speaker-independent voice recognition system can be used to identify a call recipient where voice recognition—where at least speaker-independent voice recognition system is used—may be impractical to identify a call recipient from among all subscribers in a telephone network.

Figure 3:
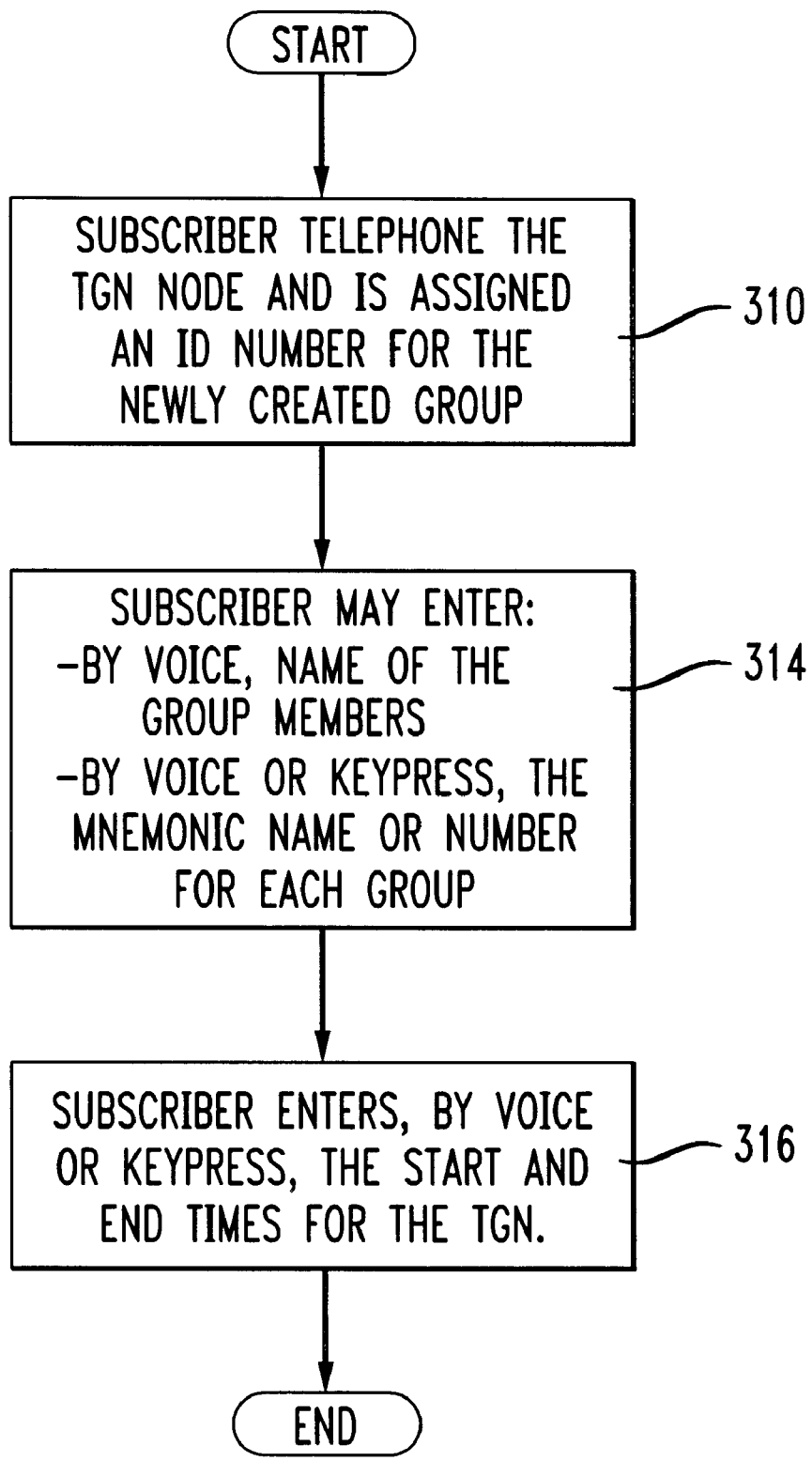

Referring to FIG. 3, to set up a TGN group, a subscriber calls the TGN node 100, 102 via an "800" or regular telephone number (step 310). The subscriber may be given an identification number or an access number for a newly created group. The TGN node obtains relevant information from the subscriber, for instance billing information, a start time and end time for activation of the TGN group, number of users, and any other relevant data. This can be accomplished by the TGN node voice prompting the subscriber who responds by key pressing or uttering a response. It may also be desirable to determine the geographical locations of the group members, the number of group members, etc. In one embodiment, all of the set-up information is collected by the TGN node and at least an initial set-up of the TGN is accomplished in a single call.

In step 314, the subscriber then sets up the membership of the TGN group. For instance, the subscriber may enter three pieces of information for each group member: the group member's name, the member's full telephone number (area code and number), and the desired mnemonic number or the utterance that will be used to identify the group member. When the configuration of the TGN group is complete, the subscriber at telephone 130 may enter other administrative information, for instance a start date and end date of the group (step 316). The subscriber at telephone 130 also identifies any telephones that are to be automatically tied to the TGN group. The TGN node 102, 110 then updates the ANI trigger table 134, 136 at the appropriate telephones' home switches 110, 114.

In another embodiment, enrollees do not assign mnemonic numbers to the group members. Instead, the TGN node 100, 102 assigns the mnemonic numbers. For example, the first enrollee may be assigned "1" as her mnemonic number, the second enrollee would be assigned "2" as her mnemonic number, and so on. It should be understood that a TGN group may be set up initially having one or no members. Thereafter, one or more members could join by telephoning the TGN node 100, 102 and joining the group one-by-one.

In an additional embodiment, an operator could be provided to take the information from the subscriber to configure the TGN node 100, 102 (steps 310, 314, 316).

Figure 4:
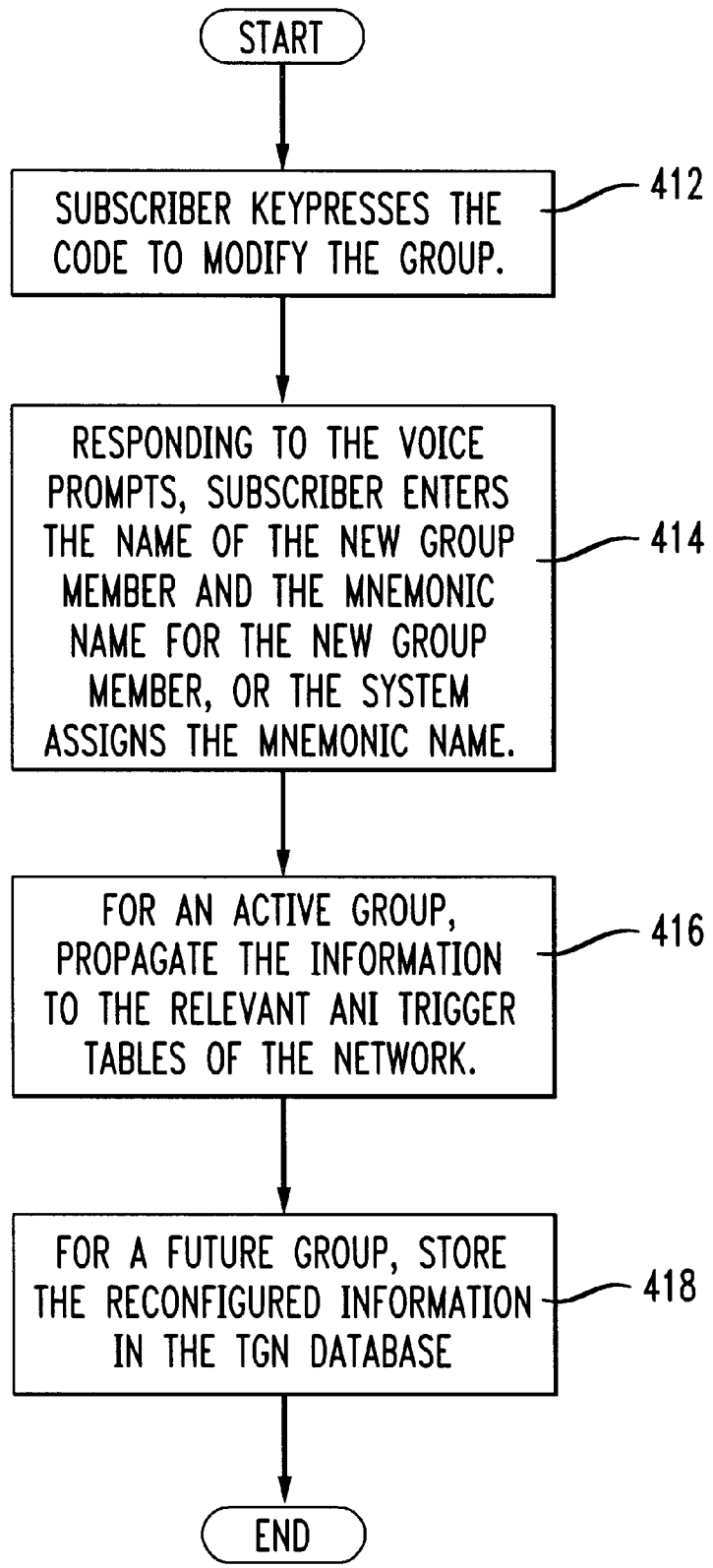

Referring FIG. 2, step 220, and to FIG. 4, a subscriber at telephone 130, 132 may wish to re-configure the TGN group, for instance to add a new member (possibly himself), drop an existing member, extend the life of the group, join a current or future TGN group, etc. In step 412, the subscriber at telephone 130, 132 key-presses or otherwise inputs a code (for instance "*" or "#") to indicate his desire to re-configure the TGN group. In step 414, TGN node 100, 102 issues voice prompts to the subscriber at telephone 130, 132 to guide the subscriber through the available re-configuration options.

A TGN group may be configured or reconfigured before a TGN group is placed in service. For instance, if the group members agree that a TGN group will exist during the month of July, the group may be configured in May for activation in July. Therefore, in step 418 the data describing the TGN group will simply lie dormant in database 124, 126 until TGN node 100, 102 finds that the activation event or date has been satisfied.

When the scheduled activation event (for instance, a calendar date and time) for the TGN group occurs, TGN node 100, 102 activates the TGN. TGN node 100, 102 retrieves data from database 124, 126 and transmits the data as needed to the nodes of the network. For instance, information from database 124, 126 may be used to program the ANI trigger table 134, 136 at the home switch of each member of the TGN group, so that each subscriber's telephone 130 will automatically connect to the proper TGN node 100, 102 when the subscriber lifts his telephone 130 off hook. The features of TGN node 100, 102 become active, as described in FIG. 2. When the TGN time limit expires, TGN node 100, 102, as directed by database 124, 126, discontinues the TGN and removes the subscribers' ANI from the ANI trigger tables 134, 136.

Alternatively, if a member reconfigures an active TGN group, for instance to add a new member, change the mnemonic dialing number, or change the telephone number associated with a member, then the reconfigured data are stored into database 124, 126, and immediately propagated to the appropriate sites of the network (step 416).

When a subscriber seeks to enroll in either a future or present TGN, many options may be provided to the subscriber by TGN node 100, 102. For example, TGN node 100, 102 could, through a voice communication system, inform the subscriber of her extension number for use within the TGN. This could be, for example, a one or two digit number. In addition, TGN node 100, 102 could inform the subscriber of the various members of the TGN for the particular event associated with the TGN. These options can be implemented with a VRU, such as the presently preferred Conversant®. It should be understood, however, that this is merely exemplary and other similar devices could be used, including, for example, other devices with VRU capabilities.

A single subscriber may belong to two or more TGN groups that are active simultaneously. This subscriber identifies which group to use for placing a call or to reconfigure. For instance, when the subscriber takes his phone off-hook, TGN node 100, 102 notices that the subscriber is a member of several groups, and prompts him to indicate, by key press or utterance, which group he or she wishes to reconfigure or call.

The configuration as specified by one member may be available to all members of the group.

Referring again to FIG. 1, when a member of a TGN places a call from a cellular telephone 150, cellular switch 152 may report to the LEC 116 or IXC 122 the routing number of the cellular switch 152 rather than the ANI of cellular telephone 150. Similarly, a call from a telephone on a PBX may have the billing number of the PBX reported, rather then the ANI of the individual telephone set connected to the PBX. Accordingly, either on enrollment (FIG. 3) or when dialing a number using the TGN feature (FIG. 2), a subscriber using a cellular telephone 150 may be required to identify himself manually (e.g., step 250 of FIG. 2) to TGN node 100, 102, so that TGN node 100, 102 can identify the TGN database entries (shown in the table below) associated with the subscriber.

| TGN NUMBER | ANI | MNEMONIC | FEATURES AUTO CONFERENCING | CONTINUOUS CONFERENCING |
|---|---|---|---|---|
| 1 | 908-949-2000 | NONE | YES | NO |
| 1 | 908-658-4000 | NONE | NO | YES |
| 1 | 908-678-1234 | NONE | YES | NO |
| . | . | . | . | . |
| . | . | . | . | . |
| . | . | . | . | . |
| 1 | 908-303-3550 | NONE | YES | NO |
| 2 | 908-610-6690 | EUGENE | NO | NO |
| 2 | 908-610-6690 | DAVID | NO | NO |
| . | . | . | . | . |
| . | . | . | . | . |
| . | . | . | . | . |
| 2 | 908-812-3235 | BOB | NO | NO |

As another alternative to step 250, a subscriber using cellular telephone 150, upon contacting TGN node 100, 102, may be required to enter the Mobile Identification Number ("MIN") or Electronic Serial Number ("ESN") of tile cellular telephone 150.

Referring again to the enrollment procedure of FIG. 3, for a cellular telephone subscriber 150, after subscriber 150 has connected to TGN node 100, 102 and entered the MIN and/or ESN of his individual telephone, TGN node 100, 102 then contacts cellular switch 152 and causes the MIN and/or ESN of the enrolling subscriber to be entered into database 154.

Once cellular telephone 150 becomes part of the TGN, future calls from the telephone 150 will be handled by TGN node 100, 102. When a signal from telephone 150 arrives at the cellular switch 152, cellular switch 152 searches database 154. If the MIN and/or ESN of the cellular telephone 150 is found in database 154, the cellular switch 152 transfers the call to TGN node 100, 102 for processing, typically accessing TGN node 100, 102 through one or more of the switches 110, 120, 160. TGN node 100, 102 will then handle the call as previously explained in connection with FIG. 2 for wired telephone 130. Database 154 may be implemented as an ANI trigger table, as discussed above with respect to the wire-line network switch 110. An illustrative ANI trigger table is shown below.

| ANI | TGN POINTER |
|---|---|
| 908-949-2000 | TGN 101 |
| 908-658-4000 | TGN 102 |
| . | . |
| . | . |
| . | . |
| 908-812-3325 | TGN 490 |

Alternatively, the cellular switch 152 may have its own TGN node 490 with an associated database 492. In this case, the cellular switch 152 would contain the TGN node 490 and all calls would be processed through the cellular switch 152.

In one embodiment of the invention, each cellular switch 152 is programmed to request more than the conventional information from the home database of a "foreign" cellular telephone. Here, the fact that a particular cellular telephone 150 is enrolled in a currently-active TGN group is recorded in only one database. This one database would typically be the database at the Mobile Telephone Switching Office ("MTSO"), or the single cellular switch 152 most responsible for the cellular telephone 150. This would be the "home port" switch, the switch at which it is recorded whether the cellular telephone 150 is a valid subscriber. When cellular telephone 150 goes off hook at a geographical location remote from its MTSO or home port switch 152, (e.g., in a different state that is served by cellular switch 156), it is conventional for cellular switch 156 to verify that the "foreign" cellular telephone set 150 that is visiting cellular switch 156 location area, is in fact registered at some switch (the owner of switch 156 wants assurance that the bill is paid up, and that the owner of switch 152 will bill the subscriber for the correct charges and pass payment through). In the present invention, cellular switch 156 consults its local associated database 158 for the MIN and/or ESN of cellular telephone 150. Finding that the telephone is "foreign," switch 156 will determine the MTSO or home switch of telephone 150, and then consult the corresponding database 154 to determine whether a TGN group is active for cellular telephone 150. If switch 152 reports that telephone 150 is part of a TGN group, it will also report the location of the TGN node 100, 102, 490 that services the TGN group. The call is then referred to the appropriate TGN node 100, 102, 490 for processing. TGN node 100, 102, 490 will then handle the call as previously explained in connection with FIG. 2 for ordinary telephone 130.

In another embodiment, a call originated from a cellular telephone 150 that is remote from its home cellular switch is handled as follows. In this embodiment, data replication is used to reduce the number of messages that must be exchanged to determine the node that is to handle the call dialed from cellular telephone 150. The home switch's database 154 is replicated at every other cellular switch 156 of the cellular network (or at least at those cellular switches at which it is likely that telephone 150 may originate a call, for instance, those along major highways) rather than being centralized at home cellular switch 152. Activation of a TGN group or reconfiguration of an active TGN group would involve a directive from TGN node 100, 102, 490 to every cellular switch 152, 156 at which cellular telephone 150 could potentially connect. This directive would add information to databases 154, 158 directing switches 152, 156 to connect the telephone to TGN node 100, 102, 490 rather than to provide conventional dial tone service to cellular telephone 150. Analogously, on expiration of the TGN group, TGN node 100, 102, 490 by referring to the database 124, 126, will direct switches 152, 154 to remove the information about the user's MIN and/or ESN from the databases 154, 158. Alternatively, databases 154, 158 could be loaded with the duration of each TGN, and the corresponding cellular switch 152, 156 could, by reference to its own database 154, 158, terminate the TGN at the appropriate expiration time.

In this embodiment, activation and expiration of TGN groups that include cellular telephones 150 would involve storing and deleting information at many nodes of the network. For instance, activation of a TGN group or reconfiguration of an active TGN group involves TGN node 100, 102, 490 issuing a directive to every cellular switch 152, 156 at which cellular telephone 150 could potentially originate a call. This directive would call for adding the appropriate information to or purging information from databases 154, 158. The added information, for instance, would direct switches 152, 156 to connect cellular telephone 150 to TGN node 100, 102, 490, rather than to provide conventional dial tone service to cellular telephone 150. Analogously, on expiration of the TGN group, TGN node 100, 102, 490, by referring to the database 124, 126, would direct switches 152, 154 to remove the information about the subscriber's MIN and/or ESN from the databases 154, 158. Alternatively, duration of each TGN may be stored in databases 154, 158 and the corresponding cellular switch 152, 156 could, by reference to its own database 154, 158, terminate the TGN at the appropriate expiration time.

In yet another embodiment, the cellular switch databases 154, 158 are replicated as described above; also, the TGN database is replicated at many TGN nodes 100, 102, 490. In this case, the database 154, 158 of every likely cellular switch 152, 156 is programmed to designate the location of its most-preferred TGN node 100, 102, 490. When a cellular telephone 150 originates a call in a foreign cell 156, database 158 directs the call to be handled by the designated TGN node 100, 102, 490.

In other alternative embodiments, it may be advantageous to have the TGN node 490 configured and connected to interact directly with a cellular switch 152 and not through a wire-line switch. This could be done, for example, if most or all of the members of the TGN were cellular users, or as a value-added service offered by the cellular carrier.

In other alternative embodiments, the ESN of the cellular telephone 150 could be used to "index" cellular telephones, rather than the MIN. This would be especially useful if cellular switch 152 transmitted the ESN into the TGN node 100, 102. This would avoid the need for the cellular telephone subscriber to enter her MIN. Alternatively, the cellular switch could transfer the MIN automatically without the subscriber entering it or the subscriber could enter the ESN when arranging with TGN node 100, 102 to be included in the TGN. All of these implementations are within the scope of the invention.

Figure 5:
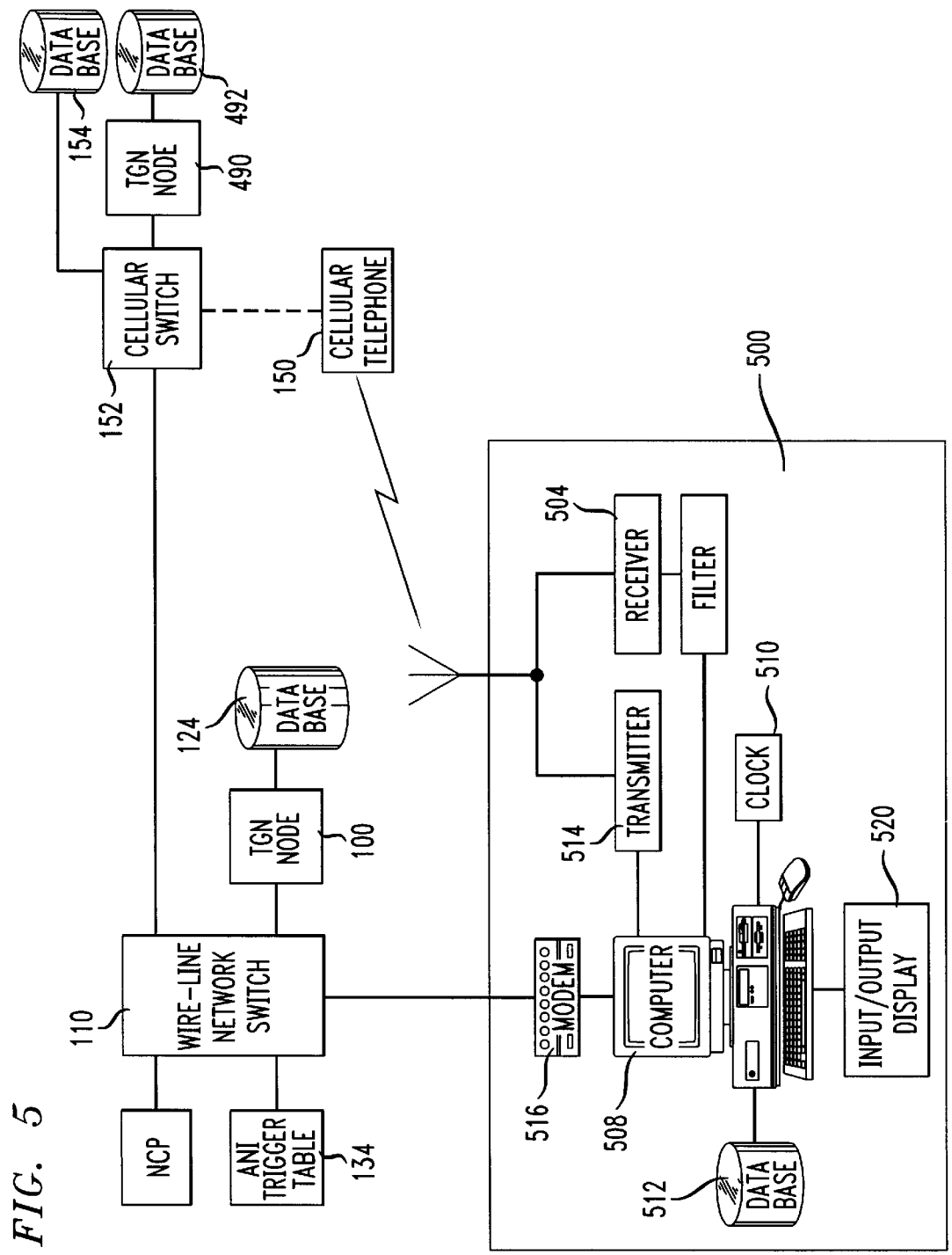
FIG. 5 is a block diagram of a device designed to allow wireless telephone sets to enroll into a temporary group network of the invention.

FIG. 5 illustrates a device 500 for enrolling subscribers of cellular telephones 150, particularly useful in a situation where the enrollment unit 500 is located at a central position and many different subscribers desire to enroll in the same TGN. For example, at a trade show, a company could provide an enrollment unit 500 at its booth or some other central location. As the company's employees attending the trade show enter the show for the day, each employee could enroll in the TGN using the enrollment unit 500. In this way, all of the employees for the company who are at the trade show that day could be part of the TGN. Easy communication among members of the TGN group could thus be facilitated. This is especially true if the various employees do not know each others' cellular telephone numbers to begin with.

Enrollment unit 500 may be placed, for example, at a funeral parlor to allow wireless telephone subscribers who are scheduled to participate in the funeral procession to automatically register their wireless telephone sets with enrollment unit 500 in order to automatically initiate or participate in a TGN conference call with other members of the funeral procession. In this way, wireless subscribers belonging to that TGN group may easily contact each other for directions in the event of a break in funeral procession which may occur, for example, when some cars stop for a red light while other cars have passed through the light when it was green.

An additional use for device 500 is for a group of buses that take pupils of a school on a school trip. Each head teacher on each bus is given a wireless telephone set previously registered for TGN conference calling through device 500.

Enrollment unit 500 has an antenna 502, a receiver 504 for receiving signals from cellular telephones 150, and a filter 506 for filtering the signals it receives from cellular telephones 150. Enrollment unit 500 also has a computer 508 that is programmed to ascertain the MIN and/or ESN from a cellular telephone 150 depending upon whether the system will use the MIN or ESN as discussed above. The computer 508 also gathers information from a clock 510 and a database 512. The computer may also have capabilities for transmitting signals via transmitter 514 or modem 516. The modem 516 transmits data from the computer to a telephone line 518. The modem 516 may also be capable of receiving data via the telephone line 518 and transmitting that data to the computer 508. Telephone line 518 is typically connected to a switch 110 of the LEC.

Enrollment unit 500 may include an input-output device and/or a display device 520. This input-output and display device 520 can be used for adding information to the database 512, programming/configuring the computer, or other commonly known functions. For instance, display 520 could be used to tell the subscriber whether his enrollment was completed, or to tell the reason for the system's failure to enroll him.

Input/output display 520 is optional, or could be configured as a unit external to enrollment unit 500. Modem 516 could be separate from enrollment unit 500. Transmitter 514 is optional. Enrollment unit 500 may be one unit as shown in FIG. 3 or may comprise many parts.

The database 512 may contain information about activation events that are to occur for which TGN's will be established. The clock 510 may give the computer 508 the date and time of day so that, when a subscriber is enrolling in a TGN using the enrollment unit 500, the computer can correlate the time of day and date from the clock 510 with the database 512 and determine which TGN group the subscriber is enrolling in. For example, if a user registers at 8 AM, the system will be able to determine that the registration is for the event associated with the 8:30 AM TGN number, as opposed to the event associated with the 12:00 PM TGN number.

The enrollment unit 500 may be used at a certain location and the subscriber using the cellular telephone 150 may only be allowed to use the enrollment unit 500 to sign up for current TGN groups. Alternately, the enrollment unit 500 could be programmed to allow enrolling in future TGN groups, or the next TGN group to become active.

Figure 6:
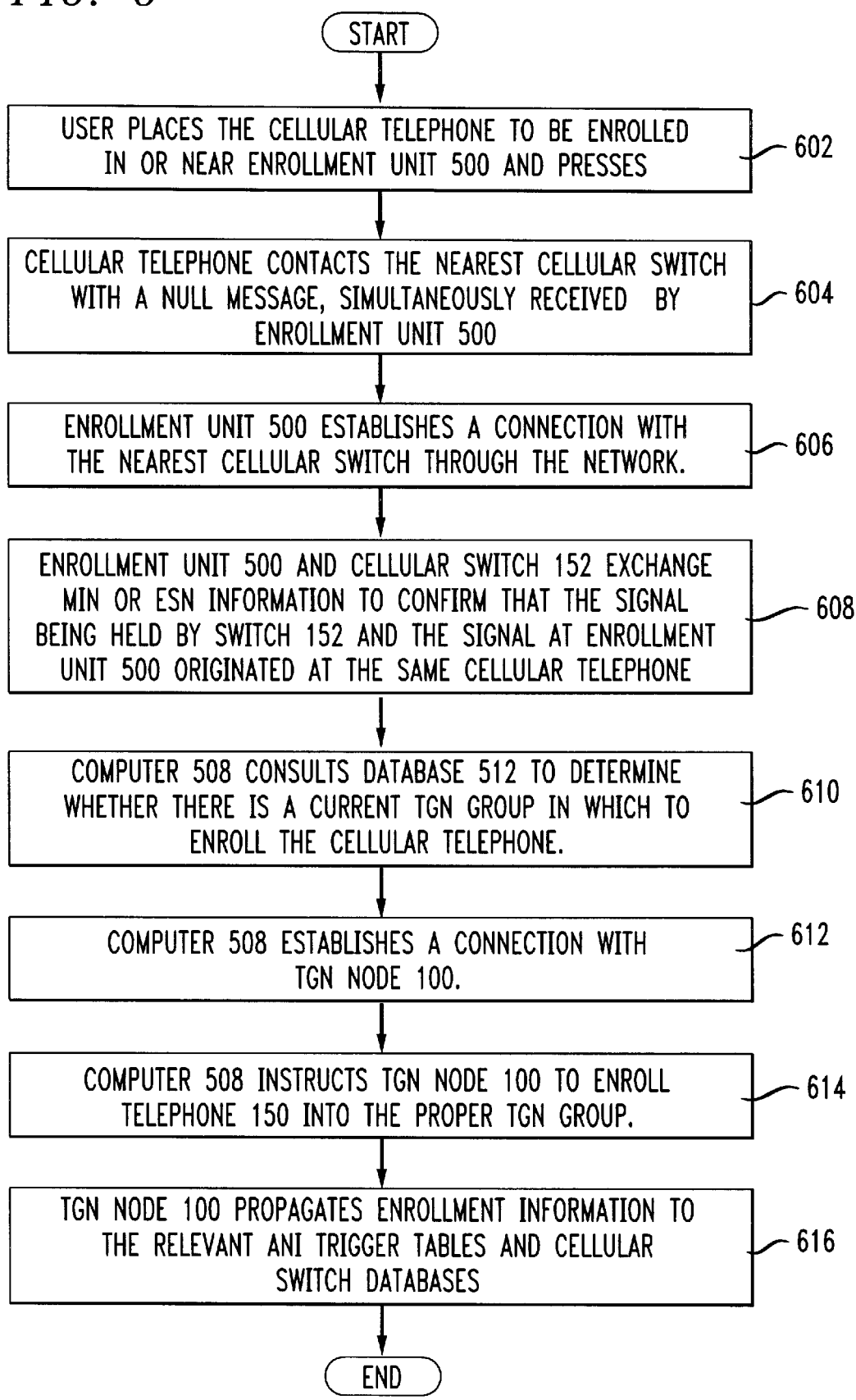
FIG. 6 is a flowchart illustrating an exemplary method of use for the device of FIG. 5.

Referring to FIGS. 5 and 6, when a subscriber using a cellular telephone 150 desires to enroll in a TGN, the cellular telephone 150 is placed in or near the enrollment unit 500 (step 602). For instance, enrollment unit 500 may be configured as a rectangular box with one face partially open, so that a subscriber can hold a cellular telephone inside enrollment unit 500. The subscriber using cellular telephone 150 then pushes a predetermined button on the telephone 150, for example the "SEND" button. In step 604, the cellular telephone 150 sends out a signal that is simultaneously received by the cellular switch 152 and the enrollment unit 500. The enrollment unit 500 has a filter 506 that recognizes only "SEND" signals from cellular telephones 150 in especially close proximity to it, for instance inside a cavity of the enrollment unit 500. Filter 506 prevents other cellular devices in the room from erroneously activating the enrollment unit 500. This in turn avoids erroneously enrolling unintended cellular telephone users in the TGN.

In step 606, using modem 516, computer 508 calls the cellular switch 152 through the wire line network switch 110. The computer can readily select the proper cellular switch 152 because the electronic location of the closest cellular switch has been stored in the database 512. As the enrollment unit 500 is contacting the cellular switch 152, the cellular switch 152 simultaneously receives the signal from the cellular telephone 150. The enrollment unit 500 directs the cellular switch 152 to hold the signal from the cellular telephone 150, and to delay processing the call until further instructions are received.

As the signal from cellular telephone 150 contacts the cellular switch 152 and the enrollment unit 500, computer 508 receives the MIN and/or ESN of the cellular telephone 150. In step 608, enrollment unit 500 and cellular switch 152 exchange information (through the wire-line network switch 110) to confirm that the MIN and/or ESN of cellular telephone 150 as recognized by enrollment unit 500 and cellular switch 152 originated from the same cellular telephone 150.

In step 610, computer 508 references clock 510 and selects from database 512 the proper TGN group that is currently active. In step 612, computer 508 establishes a connection with TGN node 100, 102 and (step 614) instructs TGN node 100, 102 to enroll the cellular telephone's MIN or ESN in the TGN group, as recorded in database 124, 128. In step 620, TGN node 100, 102 then (following its normal procedure for enrolling a new member of an active TGN group, step 416 of FIG. 4) transmits the information about the new enrollee to database 154 of cellular switch 152. As discussed above, TGN node 100, 102 may also communicate with all of the other cellular switches in the same cellular network as the originating cellular switch 152. Information relating to the identification of the cellular telephone 150 and/or duration of the TGN is stored in databases 154, 158 for each switch in the cellular network as described earlier. As described above, various methods may be implemented to start and end the TGN among the cellular switches and also to identify the cellular telephone to be directed to TGN node 100, 102. Also the TGN node 490 may be located at the cellular switch 152.

In an alternative embodiment of step 612, enrollment unit 500 may establish a data connection from modem 516 through the network (e.g., network switch 110) to cellular switch 152, then hair pin back to TGN node 100, and manage the propagation of data along that path. The cellular switch 152 would then provide the information from the enrollment unit 500 to the TGN node 100. Alternatively, modem 516 could establish simultaneous contact with TGN node 100 and cellular switch 152 through a conference call.

In an alternative embodiment of steps 614 and 616, enrollment unit 500 would first load the MIN (and/or ESN) of the subscriber's cellular telephone into database 154. Then the cellular switch 152 would contact TGN node 100, 102 associated with the wire-line switch 110 and enter the MIN/ESN into the TGN database 126. Following this, TGN node 100, 102 would contact all of the cellular switches in the cellular network and place the relevant TGN information in the databases associated with each cellular switch. Also, cellular switch 152 would confirm to the cellular telephone 150 that it is enlisted in the TGN group, for instance by displaying information on display 520 of enrollment unit 500.

The connection between cellular switch 152 and enrollment unit 500 is optional—the information need not be actually recorded into database 154 until the first TGN call originates at cellular telephone 150. But embodiments that establish this connection may be preferred. The first basis for this preference is aesthetic: the signal generated by cellular telephone 150 is probably recognized by cellular switch 152 as an erroneously-dialed number, and if the enrollment unit 500 does not contact cellular switch 152 to reassure the switch of the subscriber's intent to enroll, cellular switch 152 will send an error tone to cellular telephone 150 as it is enrolled. Moreover, if enrollment unit 500 connects to cellular switch 152, cellular switch 152 can send a verification signal to the cellular telephone 150 or to display 520. In addition, the cellular switch 152 could play a prerecorded message for the cellular telephone 152 informing the cellular telephone 150 user that it is enrolled in the TGN. In one embodiment, the short telephone number could be assigned by TGN node 100, 102, 490 as new members are registered, and the assigned number displayed as the enrollment is completed.

The TGN systems can be extremely flexible as to the numbers of subscribers and the number of TGN's allowed on each switch at a time. For emergency situations, TGN node 100, 102 could be configured such that "911" calls or emergency calls would immediately exit the TGN and be passed on for normal processing to the appropriate emergency service.

It is to be understood that the above description is only one of the preferred embodiments of the invention. Numerous other arrangements may be derived by one skilled in the art, without departing from the spirit and scope of the invention. The invention is thus limited only as defined in the accompanying claims.

We claim:

1. A method for configuring a membership of a group of users of a telecommunications network comprising the steps of:

receiving from a network end-user data indicative of a time frame within which the group will be in existence and entering said data onto a storage device accessible to a node of the network;

receiving enrollment information from one or more network end users who desire to become members of the group; and storing said enrollment information to facilitate the node in providing a mnemonic dialing service among members of the group.

2. The method of configuring a node as claimed in claim 1 wherein said enrollment information is received at an enrollment unit coupled to said node, the enrollment unit being configured to automatically detect an identification number of a telephone, and to issue programming signals to the node to enroll the telephone into the mnemonic dialing group.

3. A method for automatic conference calling comprising the steps of:

storing a configuration of a group of users of a telecommunications network in a memory of a node internal to the network, the node's stored group configuration of the group of users being accessible to members of the group of users and persisting beyond a single telephone call connected among the members of the group of users;

at the node, receiving a signal from an end-user device of an initiating member of the group of users;

without human supervision, sending from said node a supervisory signal to appropriate end-user devices of the remaining members of the group of users, and establishing a communication path to two or more of said devices of said remaining members of the group of users when said devices respond to said supervisory signals.

4. A method for establishing a conference call, comprising the steps of:

on detecting initiation of a telephone call, referencing a database to determine whether the initiating telephone line is a member of a closed-user group, the closed user group including at least three telephone lines of a telecommunications system; and automatically, and without further human intervention, establishing a conference call among the initiating telephone line and one or more members of the closed-user group by issuing supervisory signals directed to other member lines of the closed-user group as selected by the reference to the database and establishing a communication path interconnecting member devices of the closed-user group that respond to said supervisory signals.

5. A method of operating a communications network, comprising:

detecting a signal from a wireless telephone set, the detected signal including an identification number of the wireless telephone set;

determining a pre-defined group network into which the identification number is to be enrolled as a member;

transmitting the identification number to the communications network to enroll the identification number into said predefined group network, said group network being a group of telephone sets having reciprocal mnemonic dialing access to each other.

6. A telecommunication network, comprising:

a node configured for use in said telecommunications network, the node being programmable to provide a mnemonic dialing service among members of a group; and an enrollment unit configured to automatically detect an identification number of a telephone, and to issue programming signals to the node to enroll the telephone into the mnemonic dialing group.

7. The telecommunication network of claim 6, the enrollment unit further comprising a clock, and being configured to consult said clock to determine one out of a plurality of such mnemonic dialing groups into which to enroll the detected telephone unit.

8. The telecommunication network of claim 6, the enrollment unit being configured to establish a connection between the enrollment unit, a local cellular switch, and a database node to collect and process information to enroll the telephone into the mnemonic dialing group.

9. A method for connecting a telephone call, comprising:

consulting a group membership database to determine group membership of an initiator of the call, the group membership as stored in the group membership database having been configured by a member subscriber of the group via a subscriber-accessible interface, the group membership database being available to members of the group to identify the group's member lines; and connecting the call between the line at which the call is initiated and one or more member lines of the group.

10. The method of claim 9, wherein two member lines of the group reside on different local exchange carriers.

11. The method of claim 10, wherein the call is connected between the initiating telephone line and a single member of the group selected from among all members of the group, the selecting being made by the initiating member's dialing or keypressing a small number of digits mnemonically indicating the single member.

12. The method of claim 11, wherein said small number of digits is configured by a member through the subscriber-accessible interface.

13. The method of claim 9, wherein the call is connected between the initiating telephone line and a single member of the group selected from among all members of the group, the selecting being made by the initiating member's indication of a mnemonic designation of the single member.

14. The method of claim 13, wherein said mnemonic designation consists of a small number of digits dialed or keypressed.

15. The method of claim 14, wherein said small number of digits is configured by a member through the subscriber-accessible interface.

16. The method of claim 13, wherein said mnemonic designation consists of a voiced utterance.

17. The method of claim 9, further comprising the steps of:

establishing a conference call among the initiating telephone line and members of the user group, by issuing supervisory signals to two or more other member lines of the user group, and establishing a communication path interconnecting member devices of the user group that respond to said supervisory signals.

18. The method of claim 17, further comprising the step of:

obtaining from the initiating telephone line an indication that the conference call is desired before initiating said supervisory signals.

19. The method of claim 18, wherein the indication is a voice utterance.

20. The method of claim 17, further comprising the step of:

initiating the conference call supervisory signals, without human intervention, immediately upon determining that the initiating telephone line is a member of said user group.

21. The method of claim 17, further comprising the step of:

another member automatically joining a conference call already in progress.

22. The method of claim 9, further comprising the step of:

obtaining from the initiating telephone line one of two indications, on obtaining a first of said two indications, establishing a conference call among the initiating telephone line and members of the user group, by issuing supervisory signals to two or more other member lines of the user group, and establishing a communication path interconnecting member devices of the user group that respond to said supervisory signals; or, alternatively, on obtaining a second of said two indications, connecting the call between the initiating telephone line and a single member of the group selected from among all members of the group, the selecting being made by the initiating member's indication of a mnemonic designation of the single member.

23. The method of claim 9, further comprising the step of:
consulting the group membership database to determine a time frame within which the group is to be in existence, the time frame having been configured via the subscriber-accessible interface.

24. The method of claim 23, wherein the group membership database stores an expiration time for the group.

25. The method of claim 23, wherein the group membership database stores an origination time for the group.

26. The method of claim 23, wherein the group membership database stores an expiration event for the group.

27. The method of claim 23, wherein the group membership database stores an origination event for the group.

28. The method of claim 23, further comprising the step of:
receiving from a group member via the subscriber-accessible interface, an instruction to reconfigure the existence time frame for the group.

29. The method of claim 9, wherein the telephone network between members of the group includes lines of at least two of a wireless carrier, a local exchange carrier, and an interexchange carrier.

30. The method of claim 9, further comprising the step of:
connecting a call to a network subscriber not a member of the group.

31. The method of claim 9, wherein group membership of the initiating line is determined by reference to the ANI (automatic number identification) of the initiating line.

32. The method of claim 9, wherein group membership of the initiating line is determined by reference to the MIN (mobile identification number) or ESN (electronic serial number) of a mobile communications unit.

33. The method of claim 9, wherein group membership of the initiating line is determined by a telephone number dialed by the initiating caller.

34. The method of claim 33, wherein:
the initiating caller can originate the call from essentially any telephone of the network.

35. The method of claim 9, wherein group membership of the initiating line is determined by a password indicated by the initiating line, after the initiating line is connected to a server node serving two or more reciprocal communication groups.

36. The method of claim 9, wherein a recipient of the call receives a distinctive ring indicating a call originated by a group member.

37. The method of claim 9, further comprising the step of:
reconfiguring the group membership by a group member subscriber via the subscriber-accessible interface.

38. The method of claim 37, wherein the reconfiguring group member is a different member subscriber than the configuring member subscriber.

39. The method of claim 9, further comprising the step of:
reconfiguring, by a group member subscriber via the subscriber-accessible interface, a telephone number associated with a group member.

40. The method of claim 9, wherein
the group membership is replicated in databases at two nodes of the communications network, the two nodes being connected over the lines of an interexchange carrier.

41. The method of claim 40, wherein the two membership storage nodes are associated with two respective cellular switches, the two cellular switches being connected over the lines of an interexchange carrier.

42. The method of claim 9, wherein:
the configuration of the membership of each group is stored, respectively, at a single node of the communications network.

43. The method of claim 9, wherein
the group membership database is stored at a network node associated with a local exchange carrier.

44. The method of claim 9, wherein
the group membership database is stored at a network node associated with an interexchange carrier.

45. The method of claim 9, wherein
the group membership database is stored at a network node associated with a mobile carrier.

46. The method of claim 9, wherein:
the subscriber-accessible interface is implemented, at least in part, by an enrollment device configured to automatically detect an identification number of a telephone unit and, in response, to request reconfiguration of the group membership database to enroll the detected telephone unit.

47. The method of claim 46, wherein:
said enrollment device comprises a clock, and is configured to consult said clock to determine one out of a plurality of such user groups into which to enroll the detected telephone unit.

48. The method of claim 46, further comprising the step of:
establishing a connection between the enrollment device, a local cellular switch, and a database node to collect and process information for said reconfiguration of the group membership database.

49. The method of claim 46, wherein
said enrollment device comprises a visual display for configuring the group membership database.

50. A node of a telephone network, comprising:
a subscriber-accessible user interface to a database, the interface enabling a subscriber to configure the membership attributes of a group, a group membership database reflecting the membership of the group being generally accessible to members of the group for reciprocal use;
a call connector, for activation on recognition of a call initiated by a member of the group, and configured to receive a mnemonic indication of a group member and to connect the call between the initiator of the call and the indicated member based on the indication.

51. The node of claim 50, wherein member lines of the mnemonic dialing group reside on at least two different local exchange carriers.

52. The node of claim 50, wherein the call is connected between the initiating telephone line and a single member of the mnemonic dialing group selected from among all members of the mnemonic dialing group, the selecting being made by the initiating member's dialing or keypressing a small number of digits mnemonically indicating the single member.

53. The node of claim 50, wherein the call is connected between the initiating telephone line and a single member of the mnemonic dialing group selected from among all members of the mnemonic dialing group, the selecting being made by the initiating member's uttering a mnemonic voiced utterance designating the single member.

54. The node of claim 50, the call connector being further configured to:

establish a conference call among the initiating telephone line and members of the mnemonic dialing group, by issuing supervisory signals to two or more other member lines of the user mnemonic dialing group, and establishing a communication path interconnecting member devices of the user mnemonic dialing group that respond to said supervisory signals.

55. The node of claim 54, the call connector being further configured to:

initiate said conference call supervisory signals, without human intervention, immediately upon determining that the initiating telephone line is a member of said user mnemonic dialing group.

56. The node of claim 54, the call connector being further configured to:

automatically connect another group member to a conference call already in progress.

57. The node of claim 50, the node being further configured to:

obtain from the initiating telephone line one of two indications, on obtaining a first of said two indications, establish a conference call among the initiating telephone line and members of the user mnemonic dialing group, by issuing supervisory signals to two or more other member lines of the user mnemonic dialing group, and establishing a communication path interconnecting member devices of the user mnemonic dialing group that respond to said supervisory signals; or, alternatively, on obtaining a second of said two indications, connect the call between the initiating telephone line and a single member of the mnemonic dialing group selected from among all members of the mnemonic dialing group, the selecting being made by the initiating member's indication of a mnemonic designation of the single member.

58. The node of claim 50, being further configured to:

consult the group membership database to determine a time frame within which the mnemonic dialing group is to be in existence, the time frame having been configured via the subscriber-accessible interface.

59. The node of claim 50, wherein the telephone network between members of the mnemonic dialing group includes lines of at least two of a wireless carrier, a local exchange carrier, and an interexchange carrier.

60. The node of claim 50, being further configured to:

reconfigure the group membership at the request of a group member subscriber via the subscriber-accessible interface.

* * * * *